(12) United States Patent
Lee et al.

(10) Patent No.: US 8,790,545 B2
(45) Date of Patent: *Jul. 29, 2014

(54) COMPOSITION FOR LIQUID CRYSTAL FILM, LIQUID CRYSTAL FILM USING COMPOSITION, AND METHOD OF MANUFACTURING LIQUID CRYSTAL FILM

(71) Applicant: LG Chem, Ltd., Seoul (KR)

(72) Inventors: Dae-Hee Lee, Daejeon (KR); Belyaev Sergey, Daejeon (RU); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,044

(22) Filed: Oct. 16, 2012

(65) Prior Publication Data

US 2013/0053468 A1 Feb. 28, 2013

Related U.S. Application Data

(62) Division of application No. 12/923,761, filed on Oct. 6, 2010, now Pat. No. 8,318,043.

(30) Foreign Application Priority Data

Oct. 7, 2009 (KR) ........................ 10-2009-0095262

(51) Int. Cl.
*C09K 19/52* (2006.01)
*C09K 19/06* (2006.01)
*C09K 19/00* (2006.01)
*C09K 19/02* (2006.01)
*G02F 1/1333* (2006.01)

(52) U.S. Cl.
USPC .................... 252/299.01; 252/299.6; 428/1.1; 428/1.2; 428/1.3; 349/167; 349/182

(58) Field of Classification Search
USPC ............. 252/299.01, 299.6; 428/1.1, 1.2, 1.3; 349/167, 182
See application file for complete search history.

(56) References Cited

U.S. PATENT DOCUMENTS 7,515,231 B2   4/2009 Hale
8,318,043 B2 * 11/2012 Lee et al. ................. 252/299.01
2007/0134444 A1   6/2007 Harding

FOREIGN PATENT DOCUMENTS

| JP | 4323205 B1 | 6/2009 |
| KR | 10-0425263 B1 | 3/2004 |
| KR | 10-2007-0061752 | 6/2007 |
| WO | WO 2007/040796 | 4/2007 |

* cited by examiner

*Primary Examiner* — Geraldina Visconti
(74) *Attorney, Agent, or Firm* — McKenna Long & Aldridge, LLP

(57) ABSTRACT

A composition for a liquid crystal film includes: 100 parts by weight of a vertically aligned liquid crystal mixture; 0.001-20 parts by weight of a chiral dopant; and 50-900 parts by weight of a solvent.

8 Claims, 3 Drawing Sheets

COMPOSITION FOR LIQUID CRYSTAL FILM, LIQUID CRYSTAL FILM USING COMPOSITION, AND METHOD OF MANUFACTURING LIQUID CRYSTAL FILM

CROSS-REFERENCE TO RELATED APPLICATIONS

This application is a Divisional of prior application Ser. No. 12/923,761, filed Oct. 6, 2010, which claims the benefit of Korean Patent Application No. 10-2009-0095262, filed on Oct. 7, 2009, which are hereby incorporated by reference in their entirety as if fully set forth herein.

BACKGROUND OF THE INVENTION

1. Field of the Invention

The present invention relates to a composition for a liquid crystal film, and a liquid crystal film manufactured using the same, and more particularly, to a composition for a liquid crystal film, in which a chiral dopant is added to a liquid crystal for vertical alignment, and a liquid crystal film manufactured using the same.

2. Description of the Related Art

With the advance of display devices, a variety of optical films for improving the performance of display devices have been developed. Among such optical films, optical films having a predetermined level of haze have been usefully used to adjust light distribution in a variety of display devices.

Conventionally, haze has been given to an optical film by forming uneven patterns on the surface of the film or mixing foreign particles into the surface of the film. However, since these methods require an additional physical process for forming the uneven patterns, the manufacturing processes thereof are complicated and the use of the film is limited due to its uneven surface. The film becomes thick due to the mixing of the foreign particles or the formation of the uneven patterns. Also, in the case of these films, since the uneven patterns are irregularly formed, it is difficult to obtain a uniform haze all over the surface of the film.

SUMMARY OF THE INVENTION

An aspect of the present invention provides a composition, which can realize a smooth and thin film having a uniform haze, an optical film using the composition, and a method for manufacturing the optical film.

According to an aspect of the present invention, there is provided a composition for a liquid crystal film, including: 100 parts by weight of a vertically aligned liquid crystal mixture; 0.001-20 parts by weight of a chiral dopant; and 50-900 parts by weight of a solvent.

The vertically aligned liquid crystal mixture may include: 80-99.95 parts by weight of a liquid crystal monomer; and 0.05-20 parts by weight of a polymerization initiator.

The vertically aligned liquid crystal monomer may include one or more materials expressed as the following chemical formulas 1 to 4 or a combination thereof.

[Chemical Formula 1]

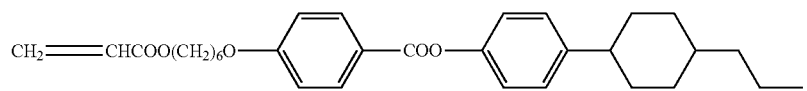

[Chemical Formula 2]

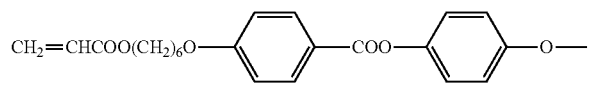

[Chemical Formula 3]

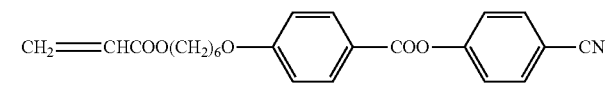

[Chemical Formula 4]

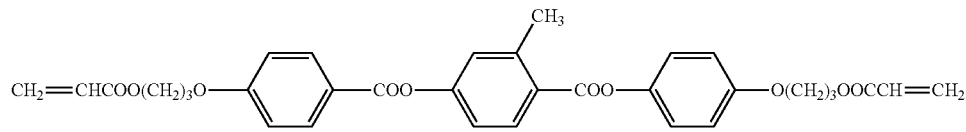

The polymerization initiator may include one or more materials selected from the group consisting of 2-methyl-1-[4-(methylthio)phenyl]-2-(4-morpholinyl)-1-propa none), 2-dimethoxy-1,2-diphenylethan-1-one), 1-hydroxy-cyclohexyl-phenyl-ketone, Triaryl sulfonium hexafluoroantimonate salts, and diphenyl(2,4,6-trimethylbenzoyl)-phosphine oxide The chiral dopant may include one or more materials selected from the group consisting of LC756 (BASF) and S-811 (Merck); however, the chiral dopant is not limited thereto. The solvent may include one or more halogenated hydrocarbons selected from the group consisting of chloroform, dichloromethane, tretrachloroethane, trichloroethylene, tetrachloroethylene, and chlorobenzene; one or more aromatic hydrocarbons selected from the group consisting of toluene, xylene, methoxybenzen, and 1,2-dimethoxybenzene; one or more alcohols selected from the group consisting of methanol, ethanol, propanol, isopropanol, acetone, methylethylketone methylisobutylketone, cyclohexanone, and cyclopentanone; one or more cellosolves selected from the group consisting of methylcellosolve, ethylcellosolve, and butylcellosolve; or one or more ethers selected from the group consisting of diethylen glycol dimethyl ether (DEGDME), and dipropylene glycol dimethyl ether (DPGDME).

The composition may further include 0.01-5 parts by weight of a surfactant. As the surfactant, a fluorocarbon-based surfactant and a silicon-based surfactant may be used solely or in a combination thereof. Examples of the fluorocarbon-based surfactant include Fluorad FC4430™, Fluorad FC4432™, and Fluorad FC4434™, which are manufactured by 3M, or Zonyl, which is manufactured by Dupont, and examples of the silicon-based surfactant include BYK™, which is manufactured by BYK-Chemie.

According to another aspect of the present invention, there is provided a liquid crystal film, including: a base substrate;

and a liquid crystal layer formed by the above-described composition and disposed on the base substrate.

The liquid crystal film may have a haze value ranging from 10% to 80%. The liquid crystal layer may have a thickness ranging from 0.1 μm to 50 μm.

The base substrate may be a glass substrate or a plastic substrate. A corona treatment may be performed on the surface of the plastic substrate.

The liquid crystal film may further include an alignment film between the base substrate and the liquid crystal layer.

According to another aspect of the present invention, there is provided a method for manufacturing a liquid crystal film, including: preparing a base substrate; coating a composition for a liquid crystal film on the base substrate, the composition being claimed in any one of claims 1 to 8; and curing the composition coated on the base substrate. The method may further include forming an alignment film before the coating of the composition.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
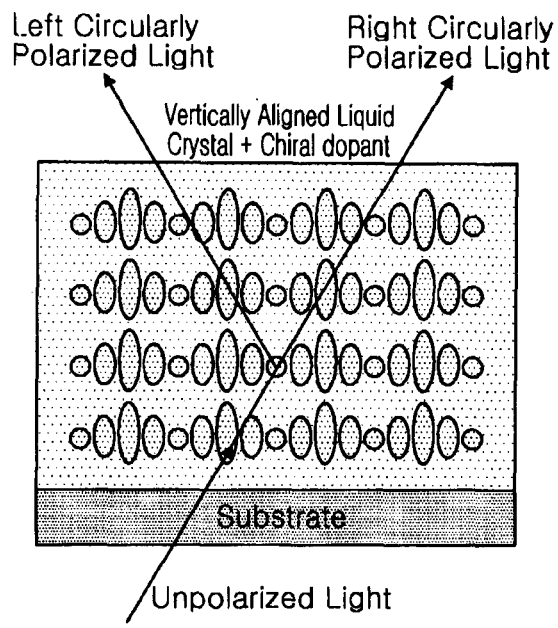
FIG. 1 illustrates a liquid crystal film according to the embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

The inventors of the present invention have conducted continuous research into a manufacture of an optical film having a desired haze through a simple process and found that an optical film having a desired haze could be manufactured through a simple process by using a composition in which a chiral dopant was added to a vertically aligned liquid crystal mixture, and completed the present invention.

First, a composition for a liquid crystal film according to an embodiment of the present invention will be described.

The composition for the liquid crystal film according to the embodiment of the present invention includes a vertically aligned liquid crystal mixture, a chiral dopant, and a solvent and, if necessary, it may further include a surfactant.

The vertically aligned liquid crystal mixture is a mixture including a vertically aligned liquid crystal monomer and a polymerization initiator and is a liquid crystal mixture arranged after alignment in a vertical direction with respect to a substrate in which an optical axis of a liquid crystal is aligned. The vertically aligned liquid crystal mixture is not specifically limited as long as the liquid crystal monomer can be polymerized with an adjacent liquid crystal monomer by light or heat to thereby form a vertically aligned polymer. Meanwhile, the optical axis of the liquid crystal refers to a direction in which phase retardation does not occur with respect to light which is linearly polarized in an incident direction. The content of the liquid crystal monomer within the liquid crystal mixture may be 80-99.95 parts by weight and the content of the polymerization initiator may be 0.05-20 parts by weight.

For example, the vertically aligned liquid crystal monomer used herein may include reactive liquid crystal monomers expressed as the following chemical formulas 1 to 4. These liquid crystal monomers may be used solely or in a combination thereof. However, the vertically aligned liquid crystal monomer is not limited to the above examples, and any kind of liquid crystal monomers forming a vertical alignment and a combination thereof may be used.

[Chemical Formula 1]
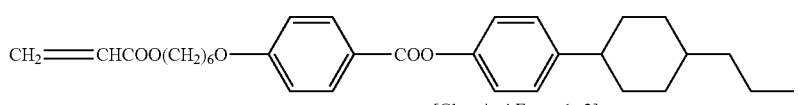

[Chemical Formula 2]
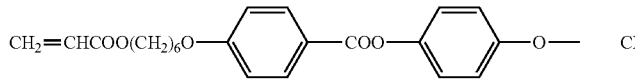

[Chemical Formula 3]
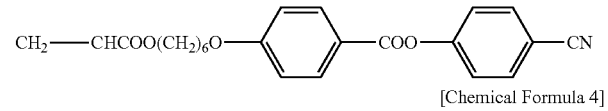

[Chemical Formula 4]
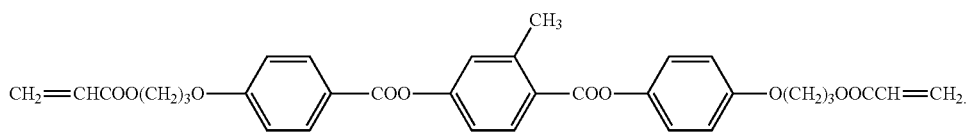

Meanwhile, the polymerization initiator is a material which initiates the polymerization of the liquid crystal monomer. Any polymerization initiator known in the art to which the invention pertains may be used as long as it has no problem in miscibility. As the polymerization initiator, 2-methyl-1-[4-(methylthio)phenyl]-2-(4-morpholinyl)-1-propanone), 2-dimethoxy-1,2-diphenylethan-1-one), 1-hydroxy-cyclohexyl-phenyl-ketone, Triaryl sulfonium hexafluoroantimonate salts, and diphenyl(2,4,6-trimethylbenzoyl)-phosphine oxide may be used solely or a combination thereof; however, the invention is not limited thereto.

In this case, the content of the polymerization initiator may be 0.05-20 parts by weight with respect to 100 parts by weight of the vertically aligned liquid crystal mixture. When the content of the polymerization initiator is less than 0.05 parts by weight, hardening failure of the film may occur. When the content of the polymerization initiator is more than 20 parts by weight, spots caused by the alignment failure of the liquid crystal may occur.

Meanwhile, the chiral dopant is a material which gives chirality to the alignment of the liquid crystal. For example, LC756 (BASF) or S-811 (Merck) may be used as the chiral dopant. The content of the chiral dopant may be 0.001-20 parts by weight with respect to 100 parts by weight of the vertically aligned liquid crystal mixture. When the content of the chiral dopant is less than 0.001 parts by weight, it is difficult to generate a haze. When the content of the chiral dopant is more than 20 parts by weight, spots caused by the vertical alignment failure of the liquid crystal may occur or transmittance may be reduced.

The solvent is not specifically limited as long as it can dissolve the liquid crystal mixture. Examples of the solvent may include halogenated hydrocarbons, such as chloroform, dichloromethane, tretrachloroethane, trichloroethylene, tetrachloroethylene, and chlorobenzene; aromatic hydrocarbons, such as benzene, toluene, xylene, methoxybenzen, and 1,2-dimethoxybenzene; alcohols, such as methanol, ethanol, propanol, isopropanol, acetone, methylethylketone methylisobutylketone, cyclohexanone, and cyclopentanone; cellosolves, such as methylcellosolve, ethylcellosolve, and butylcellosolve; and ethers, such as diethylen glycol dimethyl ether (DEGDME), and dipropylene glycol dimethyl ether (DPGDME).

As described above, the composition according to the embodiment of the present invention may further include a surfactant. When the surfactant is added to the composition, the surfactant is distributed on the surface of the liquid crystal to make it uniform. Also, the surfactant stabilizes the alignment of the liquid crystal and maintains the surface of the film to be smooth after the formation of the liquid crystal film, thereby improving the quality of the appearance of the liquid crystal film.

A fluorocarbon-based surfactant and/or a silicon-based surfactant may be used as the surfactant; however, the invention is not limited thereto. Examples of the fluorocarbon-based surfactant include Fluorad FC4430™, Fluorad FC4432™, and Fluorad FC4434™, which are manufactured by 3M, or Zonyl, which is manufactured by Dupont, and examples of the silicon-based surfactant include BYK™, which is manufactured by BYK-Chemie. Meanwhile, the content of the surfactant may be 0.01-5 parts by weight with respect to 100 parts by weight of the vertically aligned liquid crystal mixture. When the content of the surfactant is less than 0.01 parts by weight, the addition effect of the surfactant is slight. When the content of the surfactant is more than 5 parts by weight, micelle of the surfactant may occur to generate spots.

Meanwhile, like the composition for the liquid crystal film according to the embodiment of the present invention, in the case in which the chiral dopant is included together with the vertically aligned liquid crystal monomer, the chirality is given to the alignment of the liquid crystal by the chiral dopant when the liquid crystal is polymerized. Consequently, haze is generated due to the chirality in the alignment of the liquid crystal.

FIG. 1 illustrates the liquid crystal alignment structure of the liquid crystal film manufactured using the composition for the liquid crystal film according to the embodiment of the present invention. As illustrated in FIG. 1, when the liquid crystal layer is formed using the composition according to the embodiment of the present invention, a cholesteric liquid crystal alignment is shown on the liquid crystal layer. Meanwhile, in the cholesteric liquid crystal alignment, a twisted direction of a spiral structure of the liquid crystal coincides with a direction of circularly polarized light, and only circularly polarized light whose wavelength is equal to a spiral pitch is selectively reflected. The reflected wavelength is equal to "the transmittance of the liquid crystal×the pitch of the liquid crystal". That is, when the liquid crystal layer is formed using the composition according to the embodiment of the present invention, the chiral dopant gives the chirality to the vertical alignment of the liquid crystal to thereby form the cholesteric liquid crystal alignment. Consequently, light is selectively reflected according to the pitch of the liquid crystal. Such a selective reflection feature appears as light scattering, that is, haze.

Next, the liquid crystal film according to an embodiment of the present invention will be described below.

The liquid crystal film according to the embodiment of the present invention includes a base substrate and a liquid crystal layer disposed on the base substrate and, if necessary, it may further include an alignment film between the base substrate and the liquid crystal layer.

The base substrate supports the liquid crystal layer. The base substrate may be a glass substrate or a plastic substrate including a cycloolefin polymer, such as polyethylene terephthalate, polycarbonate, triacetyl cellulose, polyacrylate, polyethylene, and norbornene derivatives.

Meanwhile, when the plastic substrate is used as the base substrate, a hydrophilic treatment such a corona treatment or an alkali treatment may be carried out in order to increase the hydrophilic property of the substrate surface. This is carried out in order to improve adhesiveness between the alignment film or the liquid crystal layer and the substrate. When the hydrophilic treatment is carried out on the substrate surface, the end group having a polarity of the alignment film or the liquid crystal monomer is attached to the hydrophilic surface, and an alkyl chain having a hydrophobic property is arranged in an opposite direction, thereby achieving a vertical alignment more effectively.

Meanwhile, the liquid crystal layer is formed by the composition for the liquid crystal film according to the embodiment of the present invention. As described above, since the chiral dopant is included in the composition for the liquid crystal film, the chirality is given to the liquid crystal alignment during a process of coating and curing the liquid crystal layer, causing haze. Since detailed contents of the composition for the liquid crystal film forming the liquid crystal layer are equal to those described above, a detailed description thereof will be omitted.

Meanwhile, the liquid crystal film may be formed by directly coating the composition for the liquid crystal film on the base substrate, or may be formed by forming the vertical alignment film on the base substrate and coating the composition for the liquid crystal film on the vertical alignment film. In this case, the vertical alignment film may include an organic aligning agent, such as lecithin, trichlorosilane, trimethoxypropylsilane, hexadecyltrimethylammonium halide, and alkyl carboxylatomonochrome salt, or an inorganic aligning agent, such as $SiO_2$ or $MgF_2$. The process of forming the alignment film and the liquid crystal layer will be described later.

Meanwhile, the haze value of the liquid crystal film according to the embodiment of the present invention varies depending on the thickness of the liquid crystal film. In the case the thickness of the liquid crystal layer is small, a light haze appears. When thickness of the liquid crystal layer is large, a dark haze appears. Therefore, a film having a desired level of haze can be easily manufactured by adjusting the thickness of the liquid crystal layer.

The liquid crystal film according to the embodiment of the present invention may have various haze values according to its intended purpose. The haze value of the liquid crystal film may be 10-80%, preferably 30-70%, and more preferably 40-60%. For example, an adhesive film having a haze value of 30-50% is widely used in a transflective polarizer. A film having a haze value of 10-60% may be used as a haze layer for preventing a diffuse reflection in the polarizer.

Meanwhile, in the case of the liquid crystal film according to the embodiment of the present invention, the thickness of the liquid crystal layer is 0.1-20 μm, preferably 0.5-10 μm, and more preferably 1-5 μm. As such, since the liquid crystal film according to the embodiment of the present invention is thin as compared to the films having the typical haze values, it is suitable for use in thin products.

The liquid crystal film according to the embodiment of the present invention may be manufactured by preparing a base substrate, coating a composition for a liquid crystal film on the base substrate, and curing the composition coated on the base substrate.

First, a glass substrate or a plastic substrate is prepared as the base substrate. In the case of the plastic substrate, a hydrophilic treatment such as a corona treatment or an alkali treatment may be carried out.

Then, the composition for the liquid crystal film according to the embodiment of the present invention is coated on the base substrate. The coating method is not specifically limited only if the composition for the liquid crystal film can be coated at a uniform thickness. For example, spin coating, wire bar coating, gravure coating, dip coating, or spray coating may be used. At this time, a desired haze value can be obtained by adjusting the coating thickness of the composition.

After the composition is uniformly coated on the base substrate, the coated composition is dried to remove a solvent. The coated composition may be dried at room temperature, or may be dried in a drying oven, or may be dried by heating.

After the solvent is evaporated, the liquid crystal is cured to fix the liquid crystal layer. At this time, the liquid crystal may be cured by light or heat. An appropriate curing process may be selected depending on the kind of the liquid crystal employed.

Meanwhile, if necessary, an alignment film may be further formed on the base substrate before the coating of the composition for the liquid crystal film. The process of forming the alignment film is well known in the art to which the invention pertains. In this embodiment, the alignment film may also be formed using the conventional processes. For example, the alignment film may be formed by coating an aligning agent on the base substrate, drying and firing the coated aligning agent, and performing a rubbing process or a photo-alignment process.

Hereinafter, the present invention will be described be described in a greater detail with reference to the following examples.

EXAMPLE 1

A liquid crystal mixture containing 30.8 parts by weight of a liquid crystal monomer expressed as chemical formula 1, 21.8 parts by weight of a liquid crystal monomer expressed as chemical formula 2, 21.8 parts by weight of a liquid crystal monomer expressed as chemical formula 3, 20.1 parts by weight of a liquid crystal monomer expressed as chemical formula 4, and 5.5 parts by weight of a photoinitiator (Irgacure 907) was added to toluene so that its solid content became 30 wt %. 0.5 parts by weight of LC756™ (BASF) with respect to the weight of the liquid crystal mixture was added. Also, 0.4 parts by weight of BYK300 (BYK-Chemie), a silicon-based surfactant, with respect to the total weight of the solution was added. Then, while the solution was stirred, the solution was heated at 50° C. for 1 hour to thereby prepare a composition for a liquid crystal film.

Then, the prepared composition was coated on Zeonor (Zeon, Japan), a corona-treated norbornene derivative film, by using a wire bar coater, and was left at an oven at 70° C. for 2 minutes. Then, the composition was cured once at a rate of 3 m/min by using an 80 W/cm$^2$ high-pressure mercury lamp. In this manner, the liquid crystal film was manufactured. In the liquid crystal film, the thickness of the liquid crystal layer was about 3 μm.

EXAMPLE 2

The liquid crystal film was manufactured in the same manner as example 1, except that 1 part by weight of LC756™ (BASF), with respect to the weight of the liquid crystal mixture, was added.

EXAMPLE 3

The liquid crystal film was manufactured in the same manner as example 1, except that 2 parts by weight of LC756™ (BASF), with respect to the weight of the liquid crystal mixture, was added.

EXAMPLE 4

The liquid crystal film was manufactured in the same manner as example 1, except that 3 parts by weight of LC756™ (BASF), with respect to the weight of the liquid crystal mixture, was added.

COMPARATIVE EXAMPLE 1

The liquid crystal film was manufactured in the same manner as example 1, except that LC756™ (BASF) was not added.

Figure 2:
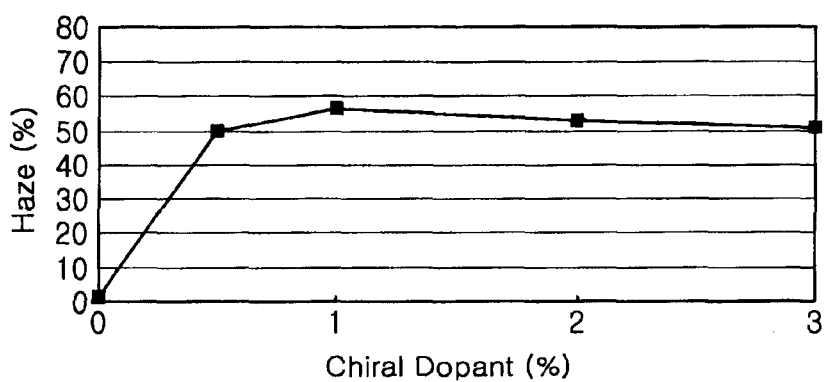
FIG. 2 is a graph showing the occurrence degree of haze with respect to the content of a chiral dopant.

Haze values of the liquid crystal films manufactured by examples 1 to 4 and comparative example 1 were measured using HR-100 (Murakami Color Research Laboratory). The measurement results are shown in FIG. 2. As can be seen from FIG. 2, the haze value rapidly increases when the chiral dopant is added to the vertically aligned liquid crystal.

Figure 3A:
FIG. 3A is a photographed image of comparative example 1.
Figure 3B:
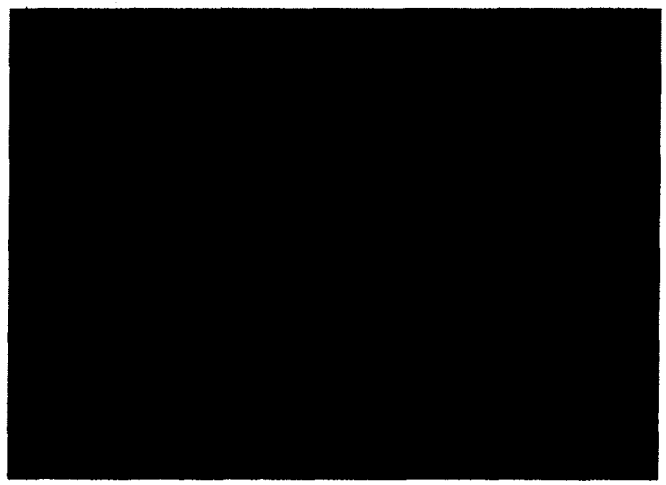
FIG. 3B is a photographed image of example 1.

Also, the liquid crystals of example 1 and comparative example 1 were placed between polarizers arranged perpendicular to each other, and the degree of light leakage was measured using ECLIPSE LV100POL (NIKON). The photographed images are shown in FIGS. 3A and 3B. FIG. 3A is the photographed image of the liquid crystal film of comparative example 1, and FIG. 3B is the photographed image of the liquid crystal film of example 1. As shown in FIG. 3, no light leakage appeared in the liquid crystal film of comparative example 1. However, in the case of the liquid crystal film of example 1, light leakage was caused by the haze film between the perpendicular polarizations.

EXAMPLE 5

The liquid crystal film was manufactured in the same manner as example 3, except that the thickness of the liquid crystal layer was 1 μm.

EXAMPLE 6

The liquid crystal film was manufactured in the same manner as example 3, except that the thickness of the liquid crystal layer was 2 μm.

EXAMPLE 7

The liquid crystal film was manufactured in the same manner as example 3, except that the thickness of the liquid crystal layer was 6 μm.

EXAMPLE 8

The liquid crystal film was manufactured in the same manner as example 3, except that the thickness of the liquid crystal layer was 8 μm.

Figure 4:
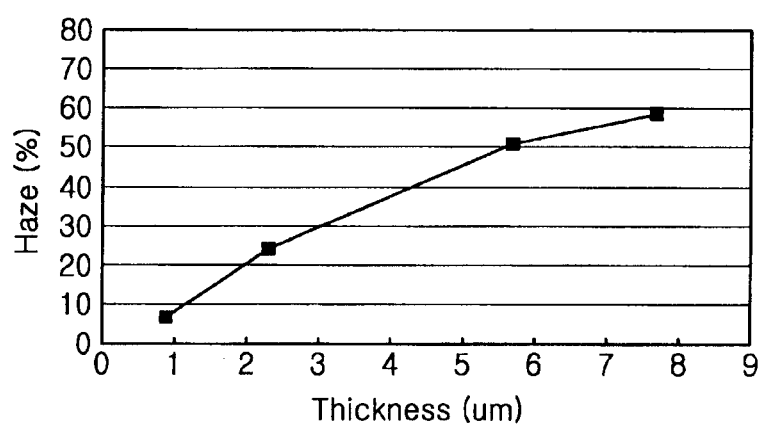
FIG. 4 is a graph showing the degree of haze with respect to the thickness of the liquid crystal film.

Haze values of the liquid crystal films manufactured by examples 5 to 8 were measured using HR-100 (Murakami Color Research Laboratory). The measurement results are shown in FIG. 4. As can be seen from FIG. 4, in the case in which the same amount of chiral dopant was included, the haze value increases in proportion to the thickness of the vertically aligned liquid crystal film.

COMPARATIVE EXAMPLE 2

The liquid crystal film was manufactured in the same manner as example 3, except that LC242™ (BASF), a horizontally aligned liquid crystal, was used.

A haze value of the liquid crystal film manufactured in by comparative example 2 was measured using HR-100 (Murakami Color Research Laboratory). The measurement result showed that the haze does not almost appear when the haze value of the liquid crystal film was 5% and the horizontally aligned liquid crystal was used.

When the composition for the liquid crystal film according to the embodiment of the present invention is used, the optical film having a desired haze can be manufactured by one-time coating. Thus, the manufacturing process is simple and economic.

Furthermore, since the liquid crystal film according to the embodiment of the present invention has a smooth surface and a small thickness, it can be applied in various fields, in particular, thin products.

Moreover, since the liquid crystal film according to the embodiment of the present invention forms haze by using the liquid crystal, a relatively uniform haze value thereof can be obtained all over the area. The haze value can be changed by adjusting the thickness of the liquid crystal layer.

While the present invention has been shown and described in connection with the exemplary embodiments, it will be apparent to those skilled in the art that modifications and variations can be made without departing from the spirit and scope of the invention as defined by the appended claims.

What is claimed is:

1. A composition for a liquid crystal film, comprising:
   100 parts by weight of a vertically aligned liquid crystal mixture;
   0.001-20 parts by weight of a chiral dopant; and
   50-900 parts by weight of a solvent,
   wherein a haze value of the liquid crystal film is changed by adjusting a thickness of the liquid crystal layer and the liquid crystal film has a haze value ranging from 10% to 80%.

2. The composition of claim 1, further comprising 0.01-5 parts by weight of a surfactant.

3. The composition of claim 1, wherein the vertically aligned liquid crystal mixture comprises:
   80-99.95parts by weight of a liquid crystal monomer; and
   0.05-20 parts by weight of a polymerization initiator.

4. The composition of claim 3, wherein the liquid crystal monomer comprises one or more materials expressed as the following chemical formulas 1 to 4;

[Chemical Formula 1]

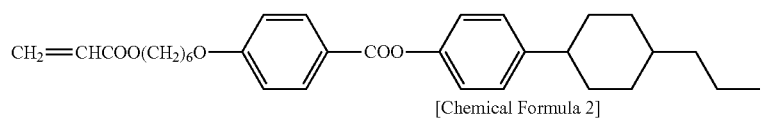

[Chemical Formula 2]    [Chemical Formula 3]

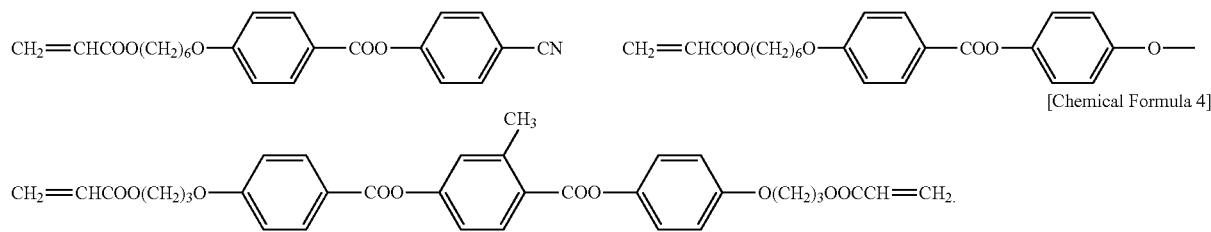

[Chemical Formula 4]

(?) indicates text missing or illegible when filed

5. The composition of claim 3, wherein the polymerization initiator comprises one or more materials selected from the group consisting of 2-methyl-1-[4-(methylthio)phenyl] -2-(4-morpholinyl)-1-propanone, 2-dimethoxy-1,2-diphenylethan-1-one, 1-hydroxy-cyclohexyl-phenyl-ketone, Triaryl sulfonium hexafluoroantimonate salts, and diphenyl(2,4,6-trimethylbenzoyl)-phosphine oxide.

6. The composition of claim 1, wherein the chiral dopant comprises one or more materials selected from the group consisting of LC756 (BASF) and S-811(Merck).

7. The composition of claim 1, wherein the solvent comprises one or more halogenated hydrocarbons selected from the group consisting of chloroform, dichloromethane, tretrachloroethane, trichloroethylene, tetrachloroethylene, and chlorobenzene; one or more aromatic hydrocarbons selected from the group consisting of benzene, toluene, xylene, methoxybenzen, and 1,2-dimethoxybenzene; one or more alcohols selected from the group consisting of methanol, ethanol, propanol, isopropanol, acetone, methylethylketone methylisobutylketone, cyclohexanone, and cyclopentanone; one or more cellosolves selected from the group consisting of methylcellosolve, ethylcellosolve, and butylcellosolve; or one or more ethers selected from the group consisting of diethylen glycol dimethyl ether (DEGDME), and dipropylene glycol dimethyl ether (DPGDME).

8. The composition of claim 2, wherein the surfactant comprises one or more material selected from the group consisting of a fluorocarbon-based surfactant and a silicon-based surfactant.

\* \* \* \* \*